(12) United States Patent
Hsu et al.

(10) Patent No.: US 7,786,432 B2
(45) Date of Patent: Aug. 31, 2010

(54) APPARATUS AND METHOD FOR CHANGING OPTICAL TWEEZERS

(75) Inventors: Long Hsu, Hsinchu (TW); Cheng-Hsien Liu, Hsinchu (TW); Sheng-Yang Tseng, Hsinchu (TW); Chung-Cheng Chou, Taoyuan County (TW); William Wang, Taoyuan County (TW); Fung-Hsu Wu, Taoyuan County (TW); Chen Peng, Taipei (TW); Ta-Yuan Lee, Taipei County (TW)

(73) Assignee: Raydium Semiconductor Corporation, Hsinchu (TW)

( * ) Notice: Subject to any disclaimer, the term of this patent is extended or adjusted under 35 U.S.C. 154(b) by 266 days.

(21) Appl. No.: 12/222,250

(22) Filed: Aug. 6, 2008

(65) Prior Publication Data

US 2009/0052038 A1    Feb. 26, 2009

(30) Foreign Application Priority Data

Aug. 22, 2007    (TW) .............................. 96131148 A (51) Int. Cl.
*H01S 1/00* (2006.01)
*H01S 3/00* (2006.01)
*H05H 3/02* (2006.01)

(52) U.S. Cl. .................. 250/251; 250/573; 250/222.2; 250/221; 359/558; 359/279; 359/566; 359/614; 359/361; 359/226.1; 359/62

(58) Field of Classification Search ................. 250/251, 250/573, 222, 2, 221; 359/558, 279, 566, 359/614, 361, 350, 226.1, 62
See application file for complete search history.

(56) References Cited

U.S. PATENT DOCUMENTS

| 2005/0176134 A1* | 8/2005 | Grier et al. ............... 435/287.2 |
| 2008/0174870 A1* | 7/2008 | Hsu et al. ................... 359/558 |
| 2009/0032692 A1* | 2/2009 | Hsu et al. ................... 250/251 |
| 2009/0051999 A1* | 2/2009 | Hsu et al. ................... 359/226 |
| 2009/0273831 A1* | 11/2009 | Hsu et al. ................... 359/387 |
| 2010/0108872 A1* | 5/2010 | Liu et al. ..................... 250/251 |

* cited by examiner

*Primary Examiner*—Jack I Berman
*Assistant Examiner*—Meenakshi S Sahu
(74) *Attorney, Agent, or Firm*—Bacon & Thomas, PLLC (57) ABSTRACT

An apparatus and a method for changing optical tweezers are provided. The apparatus includes a diffractive optical element (DOE), a mask unit and an objective lens. The DOE includes a plurality of phase delay patterns. The mask unit includes a plurality of mask patterns that correspond to the phase delay patterns, respectively, wherein at least a portion of the mask patterns are complementary. A laser beam passing through each phase diffractive pattern correspondingly passes through each mask pattern to generate a compound diffractive pattern. The objective lens receives the compound diffractive pattern and focuses it on an examining object to form an optical tweezers.

19 Claims, 7 Drawing Sheets

Phase delay of black point : $-\pi$

Phase delay of white point : $+\pi$

Phase delay of black point : $-\pi$

Phase delay of white point : $+\pi$

Transmittance of black point : 0

Transmittance of white point : 1

Transmittance of black point : 0

Transmittance of white point : 1

APPARATUS AND METHOD FOR CHANGING OPTICAL TWEEZERS

This application claims the benefit of Taiwan application Serial No. 96131148, filed Aug. 22, 2007, the subject matter of which is incorporated herein by reference.

BACKGROUND OF THE INVENTION

1. Field of the Invention

The invention relates in general to an apparatus and a method for changing optical tweezers, and more particularly to an apparatus and a method using a mask element to change optical tweezers.

2. Description of the Related Art

The technology of laser optical tweezers has been developed and is now in use already. As the laser optical tweezers is a non-destructive tweezers, which controls particles without damaging them, the laser optical tweezers is now widely used in the fields such as micro-electro-mechanical system, bio-medicine, nano manufacturing process and so on.

The current mechanisms of using laser optical tweezers technology to control particle movement cause particles to generate linear, deflective or whir-pooled particle movement by adjusting the optical field intensity or changing the DOE pattern so as to change the gradient of the optical pressure received by the particles. However, the movement of the particles cannot be controlled without adjusting a laser beam modulator or adding an external source of momentum by ways of fluidic flow or static electricity.

SUMMARY OF THE INVENTION

The invention is directed to an apparatus and a method for changing an optical tweezers. A diffractive optical element (DOE) is incorporated with a mask unit to change the shape of the optical tweezers so as to control the movement of the particles.

According to a first aspect of the present invention, an apparatus for changing optical tweezers is provided. The apparatus comprises a diffractive optical element (DOE), a mask unit and an objective lens. The DOE includes a plurality of phase delay patterns. The mask unit includes a plurality of mask patterns that correspond to the phase delay patterns, respectively, wherein at least a portion of the mask patterns are complementary. A laser beam passing through each phase diffractive pattern correspondingly passes through each mask pattern to generate a compound diffractive pattern. The objective lens receives the compound diffractive pattern and focuses it on an examining object to form an optical tweezers.

According to a second aspect of the present invention, a method for changing optical tweezers is provided. The method includes the following steps. Firstly, a laser beam is enabled to pass through a plurality of phase delay patterns. Next, the laser beam passing through each phase delay pattern correspondingly passes through a plurality of mask patterns to generate a compound diffractive pattern. Then, the compound diffractive pattern is focused on an examining object to form an optical tweezers.

According to a third aspect of the present invention, a method for generating a diffractive pattern is provided. The method includes the steps. Firstly, a plurality of phase delay patterns are provided. Next, a plurality of mask patterns are provided to respectively mask the phase delay pattern, wherein at least a portion of the mask patterns are complementary. Then, each phase delay pattern masked by the mask pattern is stacked to generate a compound diffractive pattern.

The invention will become apparent from the following detailed description of the preferred but non-limiting embodiments. The following description is made with reference to the accompanying drawings.

DETAILED DESCRIPTION OF THE INVENTION

A method for changing optical tweezers is provided in the present embodiment of the invention. The method includes the following steps. Firstly, a laser beam passes through a plurality of phase delay patterns. Next, the laser beam passing through each phase delay pattern correspondingly passes through a plurality of mask patterns to generate a compound diffractive pattern, wherein at least a portion of the mask patterns are complementary. Then, the compound diffractive pattern is focused on an examining object to form an optical tweezers. Two phase delay patterns and two mask patterns are exemplified in the embodiment.

Figure 1:
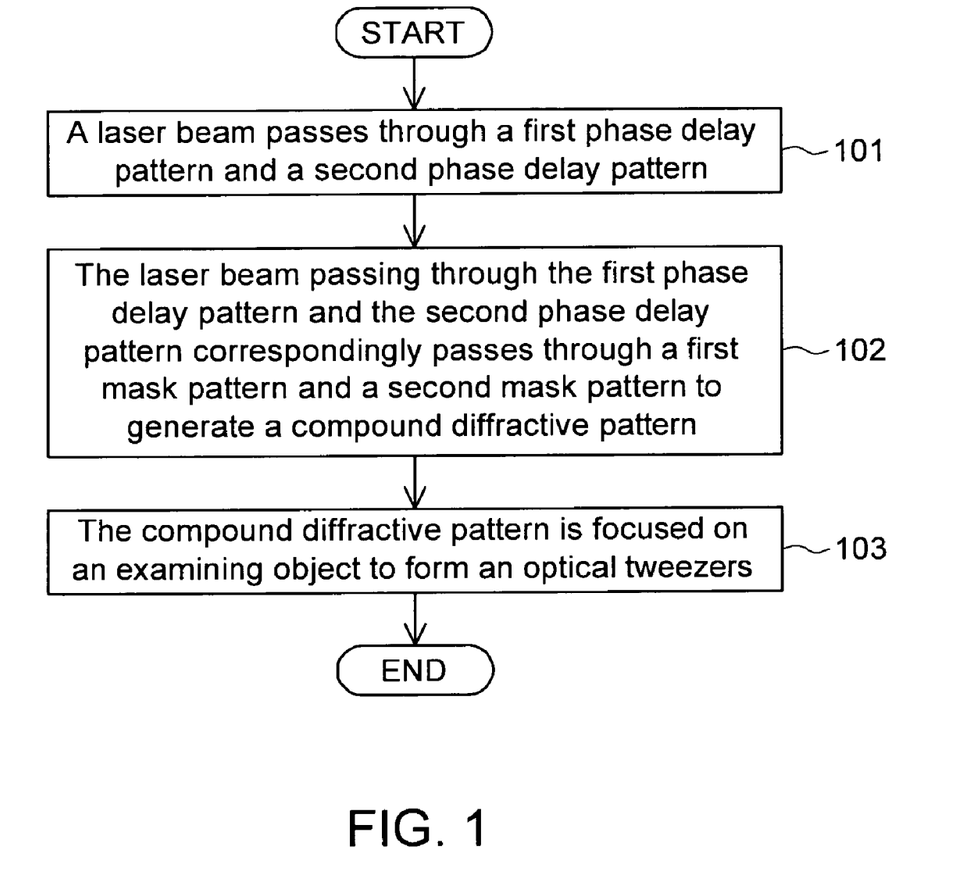
FIG. 1 shows a flowchart of a method for changing optical tweezers according to a preferred embodiment of the invention.

Referring to FIG. 1, a flowchart of a method for changing optical tweezers according to a preferred embodiment of the invention is shown. As indicated in FIG. 1, the method for changing optical tweezers includes steps 101~103. In step 101, a laser beam passes through a first phase delay pattern and a second phase delay pattern. In step 102, the laser beam passing through the first phase delay pattern and the second phase delay pattern correspondingly passes through a first mask pattern and a second mask pattern to generate a compound diffractive pattern. In step 103, the compound diffractive pattern is focused on an examining object to form an optical tweezers, and wherein the mask transmittance of the first mask pattern and the second mask pattern stacked together is substantially equal to 0. That is, the first mask pattern is complementary with the second mask pattern. Preferably, if the transmittance of the first mask pattern at a position of the mask pattern is 1, then the transmittance of the second mask pattern at the position is 0.

As the phase delay pattern results in optical path difference, a first diffractive pattern will be generated after the laser beam passes through the first phase delay pattern, and a second diffractive pattern will be generated after the laser beam passes through the second phase delay pattern.

In the method of FIG. 1, a third diffractive pattern similar to the first diffractive pattern is generated after the compound diffractive pattern further passes through another first mask pattern; or, a fourth diffractive pattern similar to the second diffractive pattern is generated after the compound diffractive pattern further passes through another second mask pattern. Thus, the shape of the optical tweezers is changed again. Examples are elaborated below.

Figure 2:
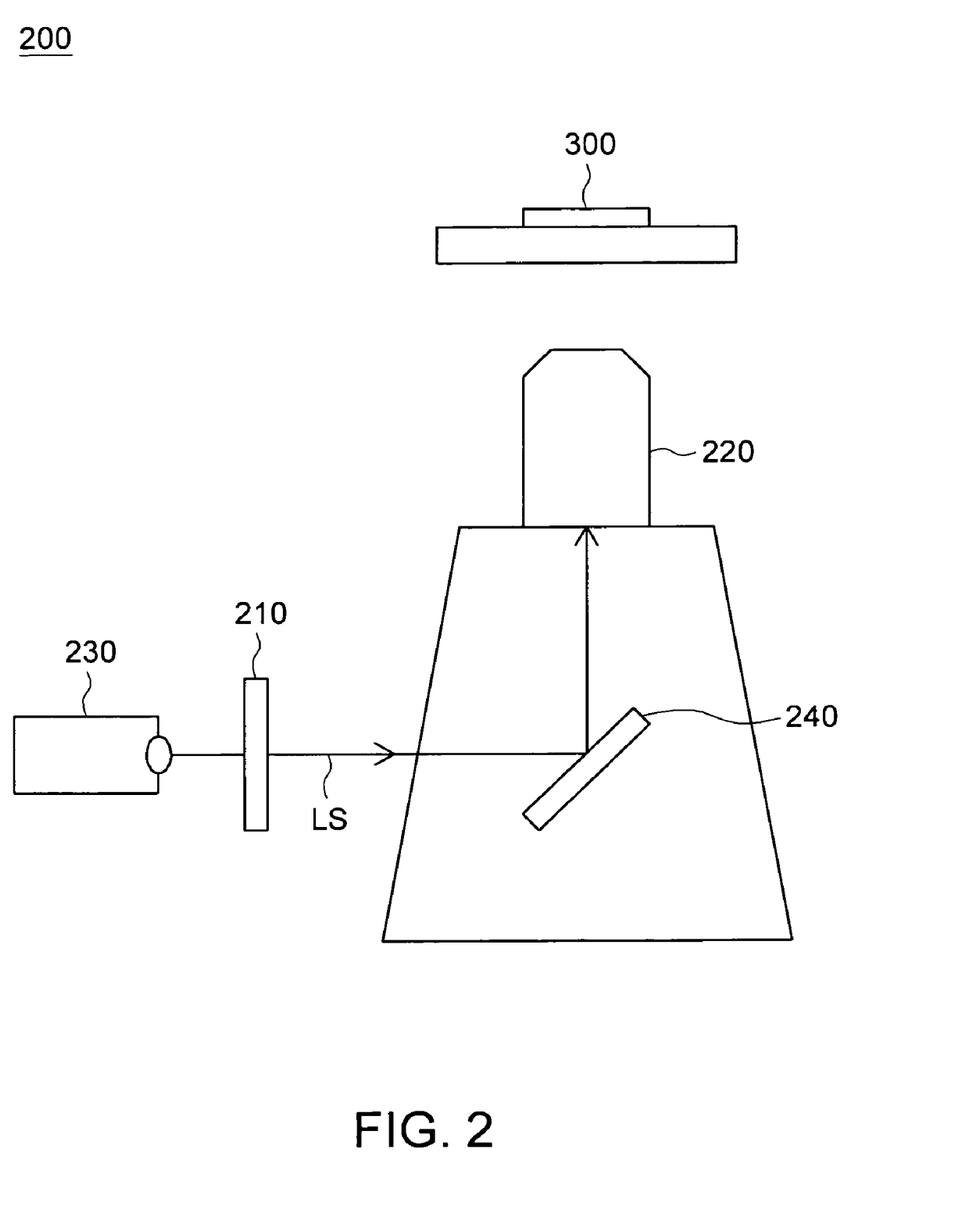
FIG. 2 shows a perspective of an apparatus for changing optical tweezers.

The apparatus for changing optical tweezers is disclosed in FIG. 2. As indicated in FIG. 2, the apparatus 200 for changing the optical tweezers includes a diffractive optical element (DOE) 210, a mask unit (not illustrated in FIG. 2), an objective lens 220 and a laser beam source 230. After a laser beam LS of the laser beam source 230 passes the DOE 210, the laser beam is projected to the objective lens 220 via the reflective lens 240 and is focused on a focal plane of the objective lens 220. The examining object 300 is positioned on the focal plane of the objective lens 220. Other lenses (not illustrated) can be disposed on the path through which the laser beam LS passes the DOE 210 and the objective lens 220 to adjust the focusing location of the laser beam LS.

Figure 3A:
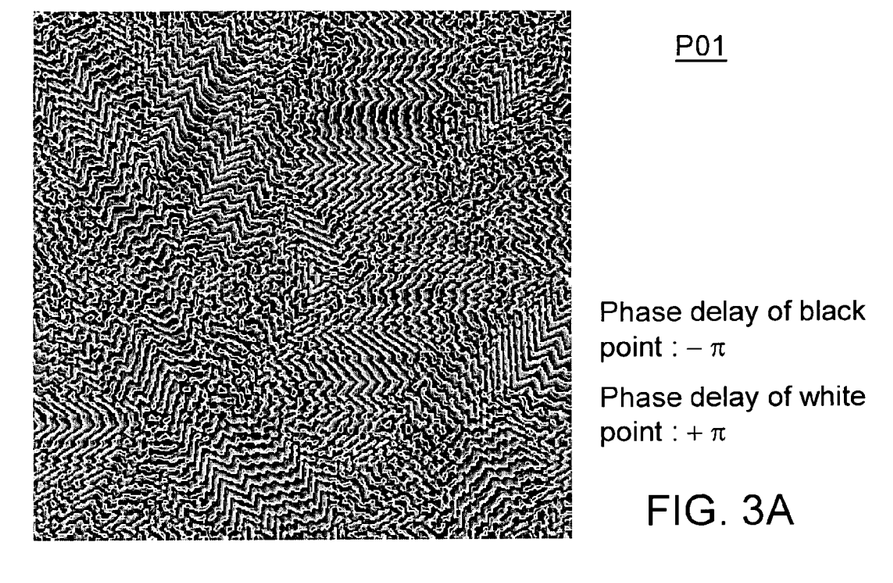
FIGS. 3A~3B show the phase delay patterns of the DOE of FIG. 2.
Figure 3B:
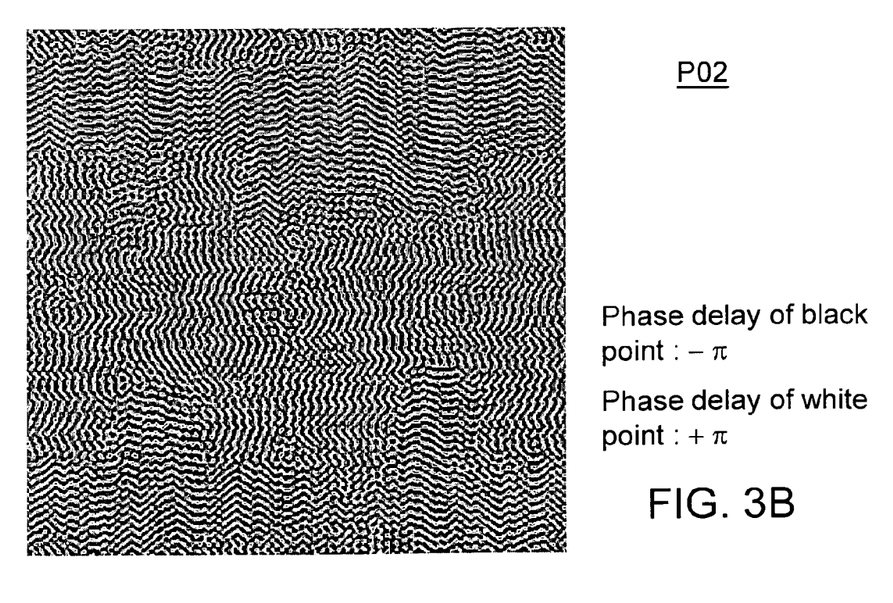

Referring to FIGS. 3A~3B, the phase delay patterns of the DOE of FIG. 2 are shown. The DOE 210, for example, includes at least a first phase delay pattern P01 (shown in FIG. 3A) and a second phase delay pattern P02 (shown in FIG. 3B). A first diffractive pattern will be generated after the laser beam LS passes the first phase delay pattern P01. A second diffractive pattern will be generated after the laser beam LS passes through the second phase delay pattern P02. The first phase delay pattern P01 and the second phase delay pattern P02 of the DOE 210 can be formed on the DOE 210 according to the design of the diffractive pattern. The first phase delay pattern P01 and the second phase delay pattern P02 are formed on the surface of the DOE 210 by way of etching, for example, to provide the DOE 210 of different thicknesses for use. Thus, the phase will change after the laser beam LS passes the DOE 210.

Figure 4A:
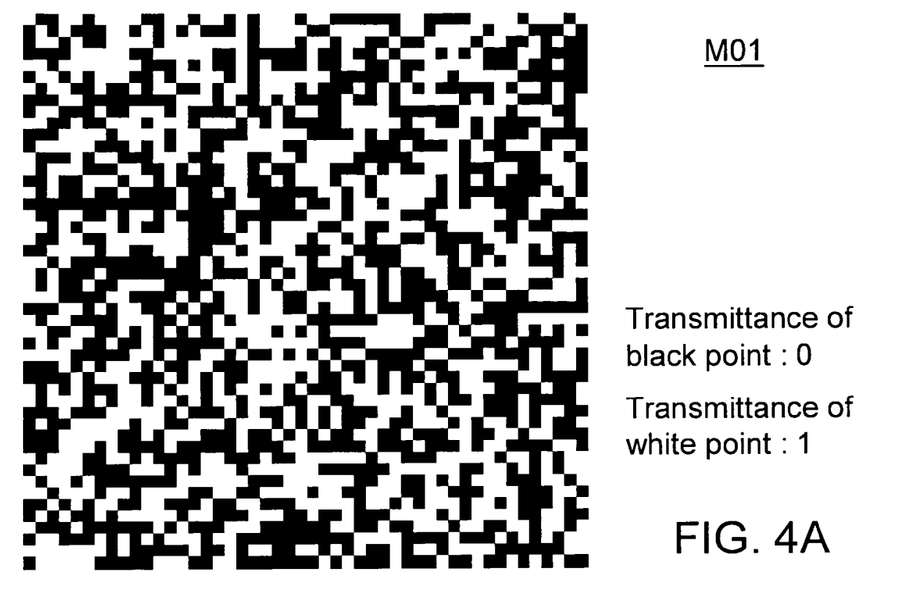
FIGS. 4A~4B show the mask patterns of a mask unit of FIG. 2.
Figure 4B:
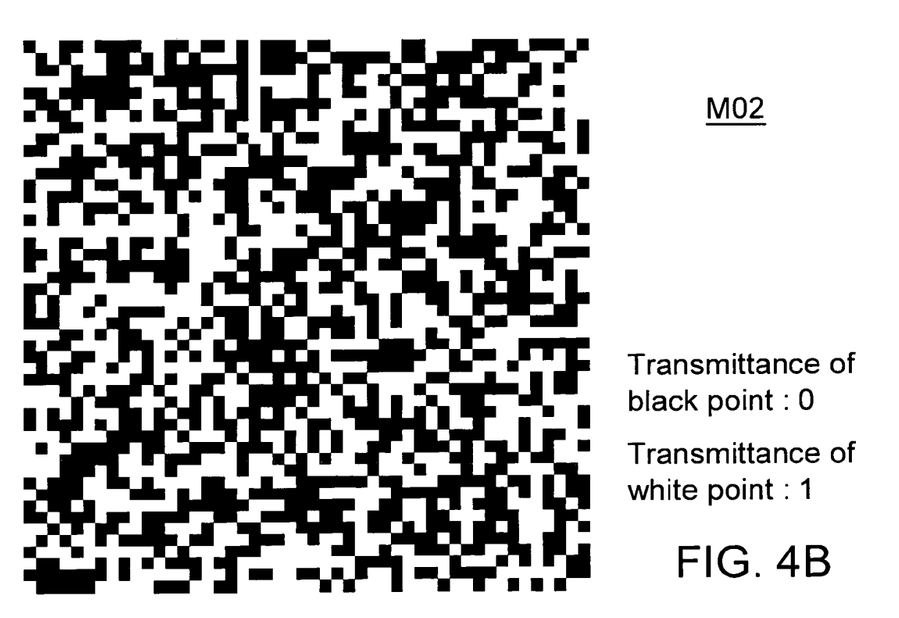

Referring to FIGS. 4A~4B, the mask patterns of a mask unit of FIG. 2 are shown. The mask unit, for example, includes at least a first mask pattern M01 and a second mask pattern M02, wherein the first mask pattern M01 is complementary with the second mask pattern M02. After the laser beam passes through the DOE 210 and respectively passes through the first mask pattern M01 and the second mask pattern M02, a compound diffractive pattern will be generated. After the compound diffractive pattern is received by the objective lens 220, the compound diffractive pattern will be focused on the examining object 300 to form an optical tweezers.

The shape of the optical tweezers is changed through the mask pattern of the mask unit. For example, after the compound diffractive pattern again passes another first mask pattern M01 of the mask unit, a third diffractive pattern similar to the first diffractive pattern will be generated; or, after the compound diffractive pattern again passes another second mask pattern M02 of the mask unit, a fourth diffractive pattern similar to the second diffractive pattern will be generated. The way of change is elaborated below in accompanying drawings.

Figure 5A:
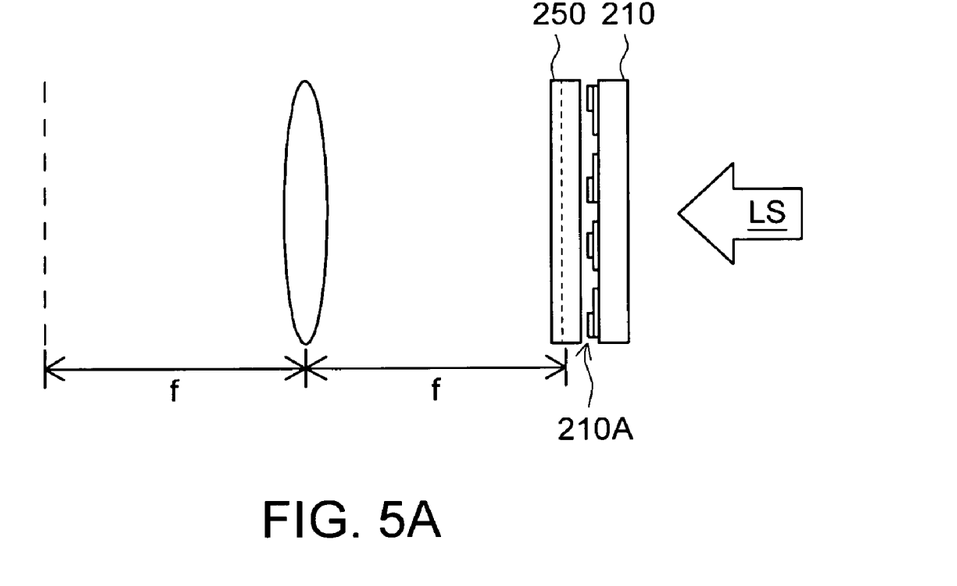
FIGS. 5A~5B show different dispositions of a mask element.
Figure 5B:
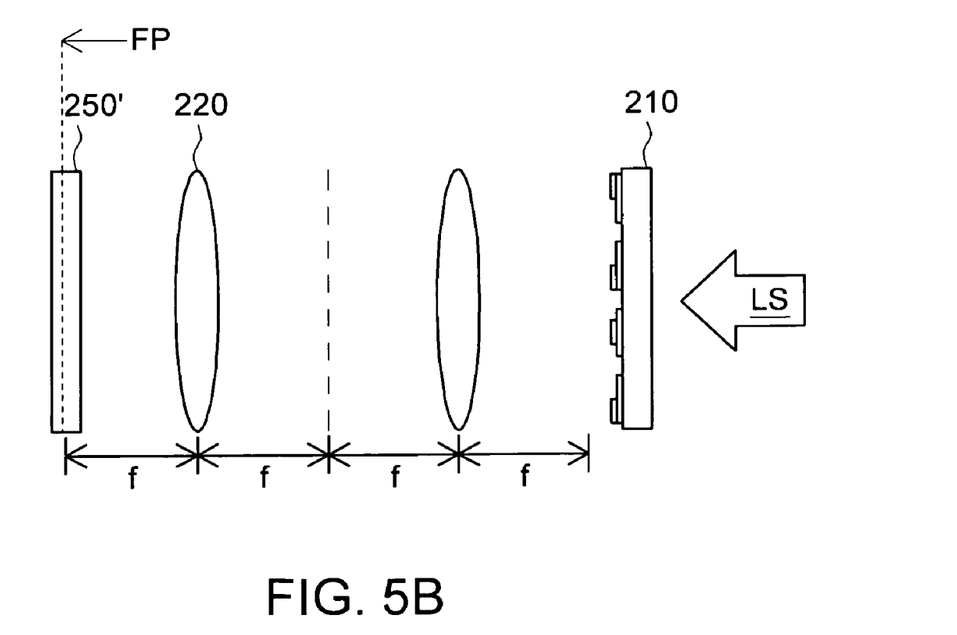

The mask unit includes a plurality of mask elements, and different mask patterns are respectively positioned on different mask elements. The disposition of mask elements is disclosed in FIGS. 5A~5B. The mask element 250 can be disposed on the light-emitting surface of 210A the DOE 210 as indicated in FIG. 5A; or, the mask element 250' can be disposed on the focal plane FP of the objective lens 220 (or other lenses) as indicated in FIG. 5B. Also, the mask element can be disposed on the light-emitting surface of 210A of the DOE 210 and on the focal plane FP of the objective lens 220. The first mask pattern M01 and the second mask pattern M01 of the mask unit are respectively disposed on different mask elements, and the shape of the optical tweezers is changed through the disposition of the mask elements and the mask patterns disposed thereon.

The mask elements are replaceable mask elements or programmable mask elements. If the mask element is a programmable mask element and preferably made from an electro-chromic material, the mask elements can be automatically controlled by controlling the voltage. Most of the electro-chromic material is transparent, and can be changed into an opaque or colored material as long as a weak current passes through it. Thus, when the electro-chromic material is used in the mask element, the transmittance of the laser beam at different positions on the mask element can be automatically adjusted through programmable design without replacing the mask element manually. Apart from the disposition of mask element shown in FIGS. 5A~5B, the electro-chromic material can directly cover the DOE 210 by way of a multiple segments method.

Besides, each point on the first mask pattern M01 of the mask unit satisfies a first mask function, and each point on the second mask pattern M02 satisfies a second mask function. The first mask function and the second mask function can be obtained through a random number generation method. The mask transmittance of the first mask pattern M01 and the second mask pattern M02 stacked together is substantially approximate to or equal to 0. That is, the first mask pattern M01 is substantially complementary with the second mask pattern M02. Preferably, if the transmittance of the first mask pattern M01 at a position of the mask pattern is 1, then the transmittance of the second mask pattern M02 at the same position is 0.

Figure 6A:
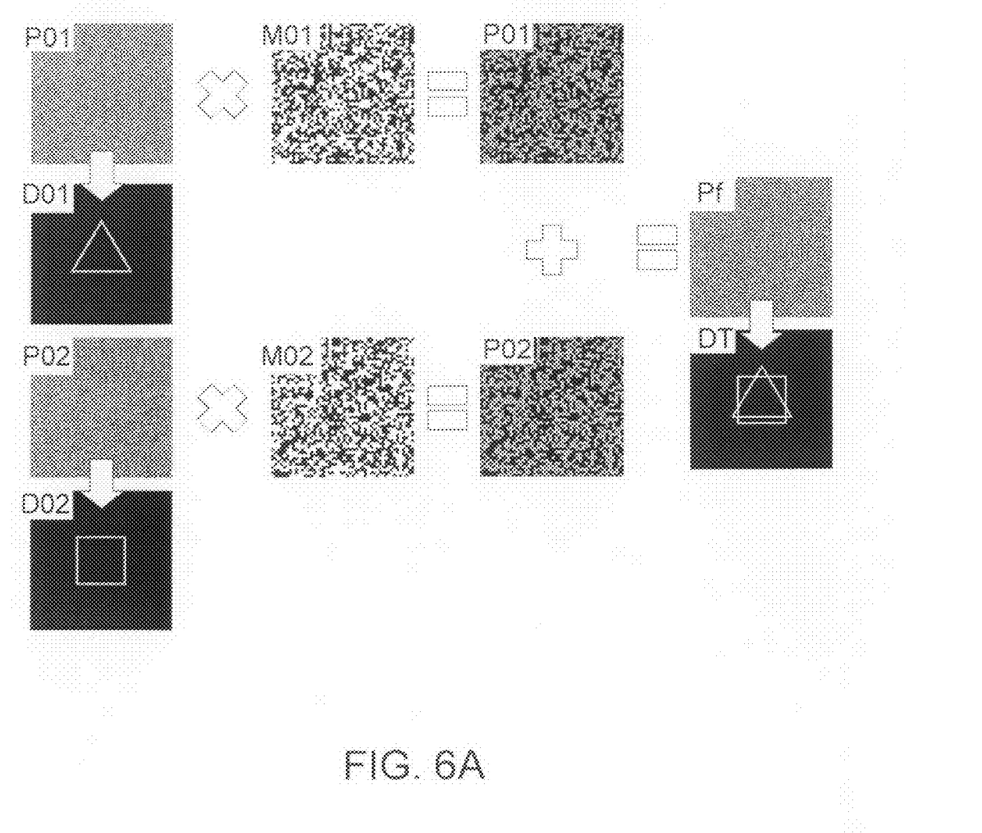
FIGS. 6A~6B simulate the processes of FIG. 1 for changing the optical tweezers.
Figure 6B:
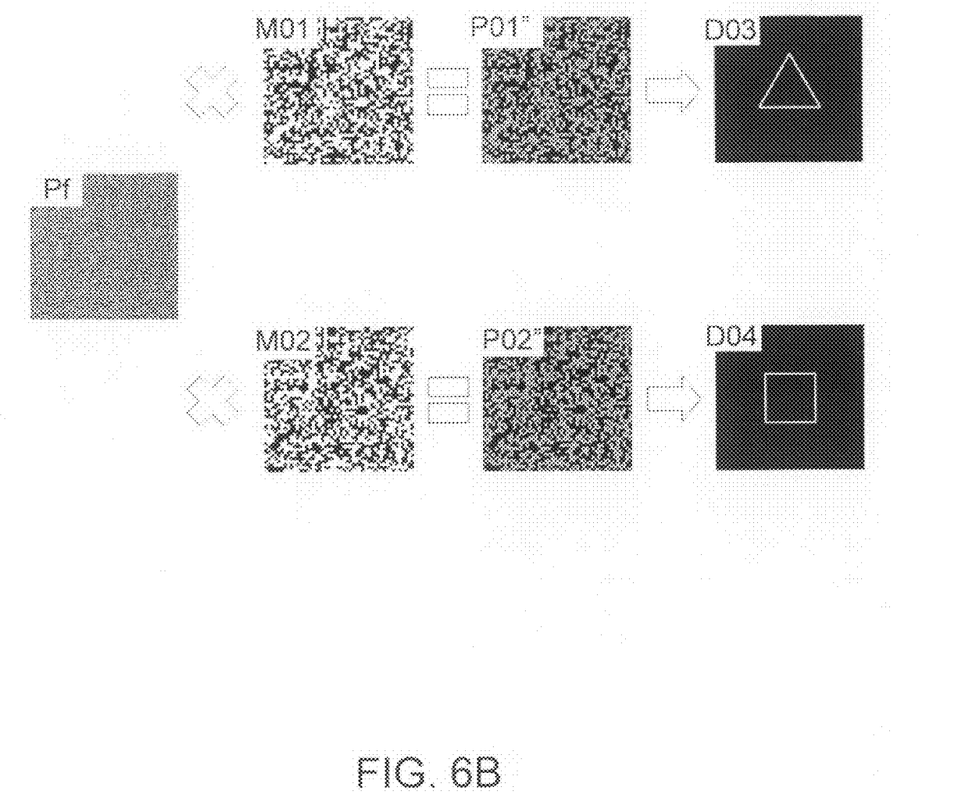

Another embodiment of the invention is disclosed below. Referring to FIGS. 6A~6B, the processes of FIG. 1 for changing the optical tweezers are simulated. In FIG. 6A, it is supposed that the laser beam LS generates a first diffractive pattern D01 after passing through a first phase delay pattern P01 of the DOE 210. The first diffractive pattern D01 has a triangular optical field distribution for example. Besides, the laser beam LS generates a second diffractive pattern D02 after passing through a second phase delay pattern P02. The second diffractive pattern D02 has a rectangular optical field distribution.

The function of the first diffractive pattern D01 is multiplied by the first mask function of the first mask pattern M01. The function of the second diffractive pattern D01 is multiplied by the second mask function of the second mask pattern M02. Then, the results of the two multiplications (P01'+P02') are added to obtain a new phase distribution Pf, and a compound diffractive pattern DT is formed according to the addition. The optical field distribution displayed by the compound diffractive pattern DT is a stacked pattern (triangle plus rectangle) of the triangular optical field distribution and the rectangular optical field distribution.

After the laser beam of the compound diffractive pattern DT is received by the objective lens, it is then focused on an examining object, and an optical tweezers with stacked pattern (triangle plus rectangle) will be formed on the examining object.

The shape of the optical tweezers needs will be changed as long as the compound diffractive pattern DT with phase distribution Pf passes another first mask pattern M01 or another second mask pattern M02. As indicated in FIG. 6B, after the compound diffractive pattern DT with phase distribution PF passes another first mask pattern M01 and is focused, an optical tweezers of a third diffractive pattern D03 similar to the first diffractive pattern D01 (shown in FIG. 6A) will be formed. The sum of the transmittance of the first mask pattern M01 and the transmittance of the second mask pattern M02 at the same point is 0. That is, at the same point, if the transmittance of the first mask pattern M01 is 1, then the transmittance of the second mask pattern M02 is 0. Thus, when the laser beam of the compound diffractive pattern DT passes through the first mask pattern M01, the passable position of the second mask pattern M02 is masked, and the optical field corresponding to the second diffractive pattern D02 is blocked accordingly. Thus, the third diffractive pattern D03 similar to the first diffractive pattern D01 is formed, and an optical field similar to a triangle is shown.

Likewise, when the laser beam of the compound diffractive pattern DT with phase distribution PF passes through another second mask pattern M02, the passable position of the first mask pattern M01 is virtually masked, and the optical field corresponding to the first diffractive pattern D01 is blocked accordingly. Thus, a fourth diffractive pattern D04 similar to the second diffractive pattern D02 is formed, and an optical field similar to a rectangle is shown.

In the present embodiment of the invention, the DOE has two phase delay patterns and the mask unit also has two mask patterns. However, in practical application, more phase delay patterns can be used to cooperate with other mask patterns so that a compound diffractive pattern that fits actual needs will be formed.

The optical field of the laser beam on an examining object can be designed and adjusted according to actual needs to control the movement of the particles. For example, the technology of optical tweezers can be widely used in the particle selection and particle driving. In addition, the technology of automatically changing optical tweezers is particularly valuable to the fields of bio-medicine, optic-electro system, micro-electro-mechanical system, nano manufacturing process, and so on.

According to the apparatus and the method for changing optical tweezers disclosed in the above embodiment of the invention, a DOE is incorporated with a mask unit so that after a laser beam passes through a phase delay pattern of the DOE and a mask pattern of the mask unit, the optical field of the laser beam on an examining object is changed, so as to change the shape of an optical tweezers.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for changing optical tweezers, comprising:
   a diffractive optical element (DOE) having a plurality of phase delay patterns;
   a mask unit having a plurality of mask patterns corresponding to the phase delay patterns, wherein a laser beam passing through each phase delay pattern correspondingly passes through each mask pattern to generate a compound diffractive pattern, and at least a portion of the mask patterns are complementary; and
   an objective lens for receiving the compound diffractive pattern and focusing it on an examining object to form an optical tweezers in accordance with the compound diffractive pattern.

2. The apparatus according to claim 1, wherein the phase delay patterns comprises:
   a first phase delay pattern, wherein the laser beam passes through the first phase delay pattern to form a first diffractive pattern; and
   a second phase delay pattern, wherein the laser beam passes through the second phase delay pattern to form a second diffractive pattern different from the first diffractive pattern.

3. The apparatus according to claim 2, wherein the mask patterns comprises:
   a first mask pattern corresponding to the first phase delay pattern; and
   a second mask pattern corresponding to the second phase delay pattern, wherein the mask transmittance of the first mask pattern and the second mask pattern stacked together is substantially equal to 0;
   wherein, the laser beam passes through the first phase delay pattern and the second phase delay pattern, and then forms the compound diffractive pattern after correspondingly passing through the first mask pattern and the second mask pattern respectively.

4. The apparatus according to claim 3, wherein, after the compound diffractive pattern passes another first mask pattern, a third diffractive pattern similar to the first diffractive pattern is generated to change the shape of the optical tweezers.

5. The apparatus according to claim 3, wherein after the compound diffractive pattern passes another second mask pattern, a fourth diffractive pattern similar to the second diffractive pattern is generated to change the shape of the optical tweezers.

6. The apparatus according to claim 1, wherein the mask unit comprises a plurality of mask elements on which the mask patterns are positioned.

7. The apparatus according to claim 6, wherein each mask element is a programmable mask element.

8. The apparatus according to claim 6, wherein each mask element comprises an electro-chromic material.

9. The apparatus according to claim 6, wherein at least one mask element is positioned on a focal plane of the objective lens.

10. The apparatus according to claim 6, wherein at least one mask element is positioned on a light-emitting surface of the DOE.

11. The apparatus according to claim 6, further comprising:
    at least a lens set disposed between the DOE and the objective lens, wherein at least one mask element is positioned on a focal plane of the lens set.

12. A method for changing optical tweezers, comprising:
    (a) enabling a laser beam to pass through a plurality of phase delay patterns;
    (b) enabling the laser beam passing through each phase delay pattern to correspondingly pass through a plurality of mask patterns to generate a compound diffractive pattern, wherein at least a portion of the mask patterns are complementary; and
    (c) enabling the compound diffractive pattern to focus on an examining object to form an optical tweezers.

13. The method according to claim 12, wherein the step (a) comprising:
    (a1) enabling the laser beam to pass through a first phase delay pattern of the phase delay patterns to form a first diffractive pattern; and
    (a2) enabling the laser beam to pass through a second phase delay pattern of the phase delay patterns to form a second diffractive pattern different from the first diffractive pattern.

14. The method according to claim 13, wherein the step (b) comprising:
    (b1) enabling the laser beam to pass through the first phase delay pattern and the second phase delay pattern and form the compound diffractive pattern after correspondingly passing through a first mask pattern and a second mask pattern of the mask patterns respectively, wherein the mask transmittance of the first mask pattern and the second mask pattern stacked together is substantially equal to 0.

15. The method according to claim 14, between step (b) and step (c), the method further comprising the step of:
   (d) enabling the compound diffractive pattern to passes another first mask pattern to generate a third diffractive pattern similar to the first diffractive pattern so to change the shape of the optical tweezers.

16. The method according to claim 14, between step (b) and step (c), the method further comprising the step of:
   (d) enabling the compound diffractive pattern to passes another second mask pattern to generate a fourth diffractive pattern similar to the second diffractive pattern so to change the shape of the optical tweezers.

17. A method for generating diffractive pattern, comprising:
   (a) providing a compound diffractive pattern which is generated by providing a plurality of phase delay patterns and a plurality of mask patterns to respectively mask each phase delay pattern, wherein at least a portion of the mask patterns are complementary, and then stacking each phase delay pattern respectively masked by each mask pattern; and
   (b) enabling a laser beam to pass through the compound diffractive pattern and a first mask pattern to generate a diffractive pattern similar to a first diffractive pattern.

18. The method according to claim 17, wherein the step (a) comprises:
   (a1) enabling the laser beam to pass through a first phase delay pattern of the phase delay patterns to form the first diffractive pattern; and
   (a2) enabling the laser beam to pass through a second phase delay pattern of the phase delay patterns to form a second diffractive pattern different from the first diffractive pattern.

19. The method according to claim 18, wherein the step (a) comprises:
   enabling the laser beam to pass through the first phase delay pattern and the second phase delay pattern and form the compound diffractive pattern after correspondingly passing through another first mask pattern and a second mask pattern of the mask patterns respectively, wherein the mask transmittance of the first mask pattern and the second mask pattern stacked together is substantially equal to 0.

* * * * *